United States Patent
Rimas-Ribikauskas et al.

(10) Patent No.: US 7,458,038 B2
(45) Date of Patent: Nov. 25, 2008

(54) SELECTION INDICATION FIELDS

(75) Inventors: Emily K. Rimas-Ribikauskas, Seattle, WA (US); Eric B. Fox, Seattle, WA (US); Matthew R. Lerner, Seattle, WA (US); Corinne S. Sherry, Seattle, WA (US); Jeffrey Pettiross, Seattle, WA (US)

(73) Assignee: Microsoft Corporation, Redmond, MA (US)

( * ) Notice: Subject to any disclaimer, the term of this patent is extended or adjusted under 35 U.S.C. 154(b) by 524 days.

(21) Appl. No.: 11/015,347

(22) Filed: Dec. 20, 2004

(65) Prior Publication Data
US 2006/0136845 A1   Jun. 22, 2006

(51) Int. Cl.
*G06F 17/00* (2006.01)
(52) U.S. Cl. .............. 715/862; 715/821; 715/822; 715/823; 715/824
(58) Field of Classification Search ............... None
See application file for complete search history.

(56) References Cited

U.S. PATENT DOCUMENTS

| | | | | |
|---|---|---|---|---|
| 5,450,539 | A | * | 9/1995 | Ruben ............... 715/840 |
| 5,546,527 | A | | 8/1996 | Fitzpatrick et al. |
| 5,737,554 | A | * | 4/1998 | Epelman-Wang et al. ... 715/862 |
| 6,144,379 | A | | 11/2000 | Bertram et al. |
| 6,307,544 | B1 | | 10/2001 | Harding |
| 6,483,526 | B1 | | 11/2002 | Merrick |
| 6,643,668 | B2 | | 11/2003 | Sluiman |
| 2002/0004729 | A1 | * | 1/2002 | Zak et al. ............... 705/3 |
| 2003/0052927 | A1 | | 3/2003 | Barksdale et al. |
| 2004/0145601 | A1 | | 7/2004 | Brielmann et al. |
| 2004/0179044 | A1 | | 9/2004 | Carter et al. |

OTHER PUBLICATIONS

John T. Richards et al., "Web Accessibility: A Broader View", pp. 72-79, 2004.
Gregory D. Abowd et al., "The Family Video Archive: An annotation and browsing environment for home movies", pp. 1-8, Nov. 7, 2003.
Michael Terry et al., "Side Views: Persistent, On-Demand Previews for Open-Ended Tasks", pp. 71-80, vol. 4, Issue 2.
J. Ruthruff et al., "End-User Software Visualizations for Fault Localization", p. 123, ACM Symposium on Software Visualization, 2003.
John Richards et al., "Web Accessibility: A Broader View", pp. 72-79, 2004.
Steve Calde et al., "SHS Orcas: The first integrated information system for long-term healthcare facility management", 2002 American Institute of Graphic Arts.
Anind K. Dey et al., "a CAPpella: Programming by Demonstration of Context-Aware Applications", pp. 33-40, vol. 6, No. 1, 2004.

* cited by examiner

*Primary Examiner*—Jinhee Lee
(74) *Attorney, Agent, or Firm*—Amin, Turocy & Calvin, LLP

(57) ABSTRACT

A system and method for selectively displaying selection indication fields is described. A user may select multiple items using various selection indication fields. The fields may be displayed all the time or may only appear if a pointing device or cursor is near the field or an associated item.

12 Claims, 8 Drawing Sheets

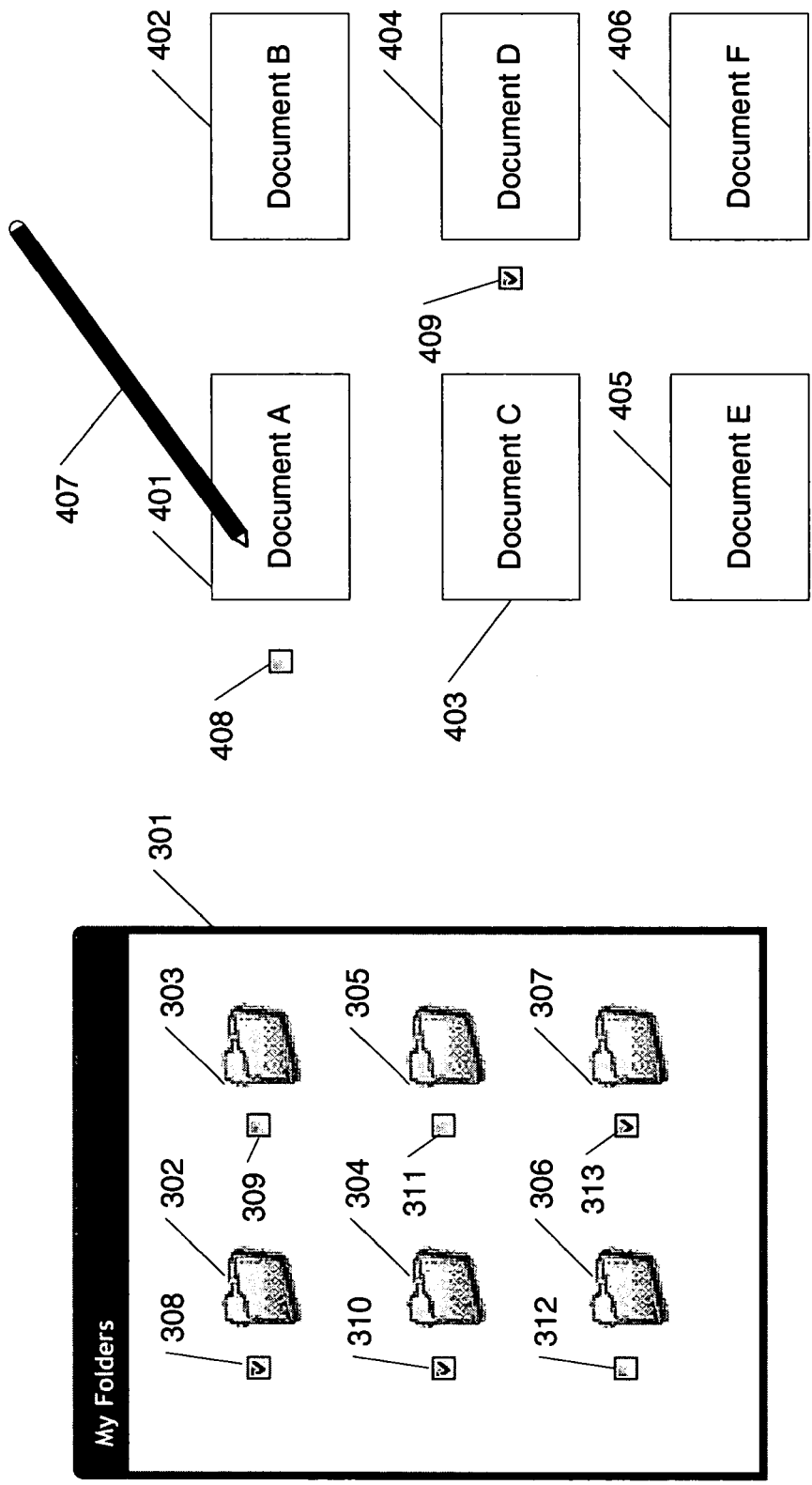

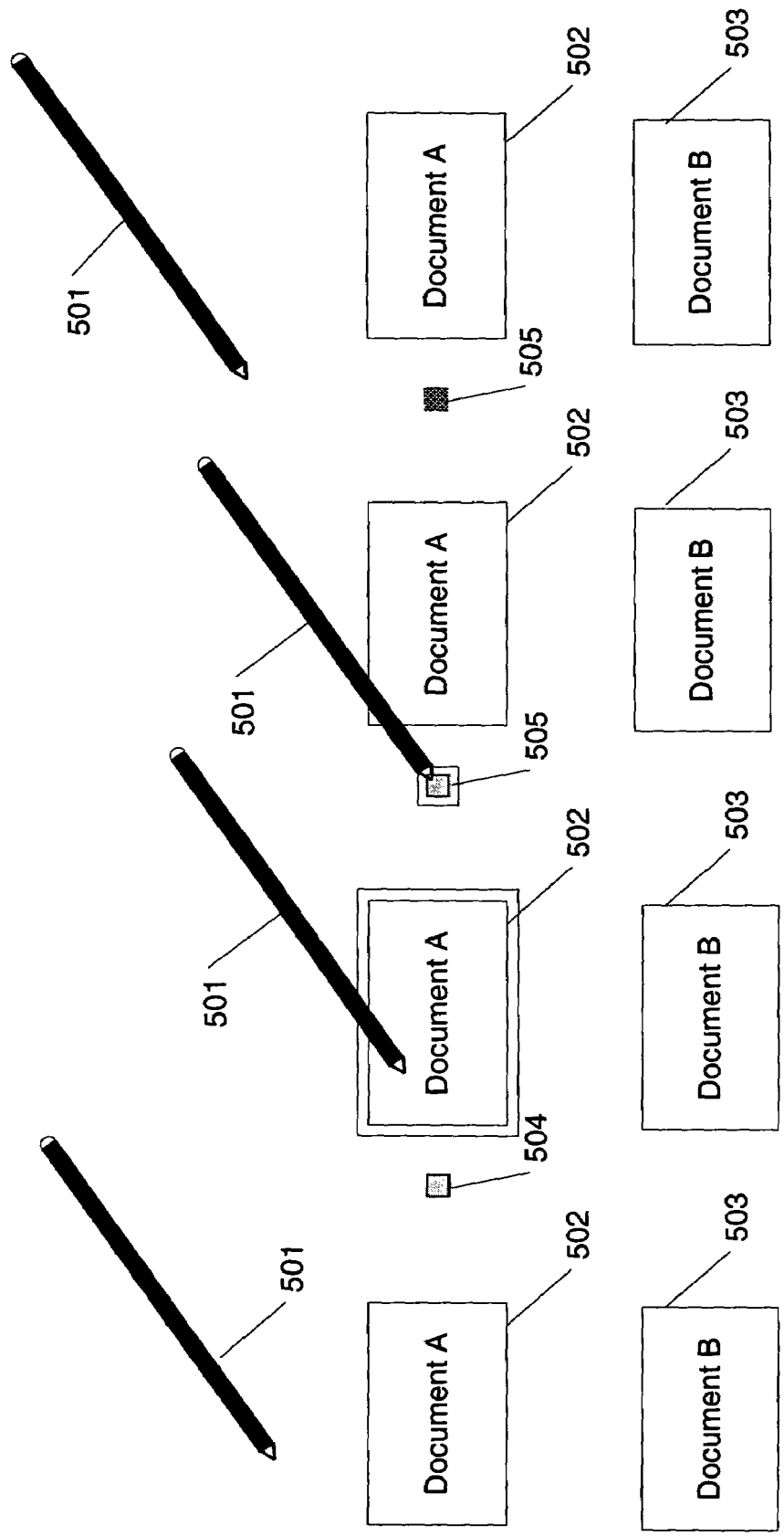

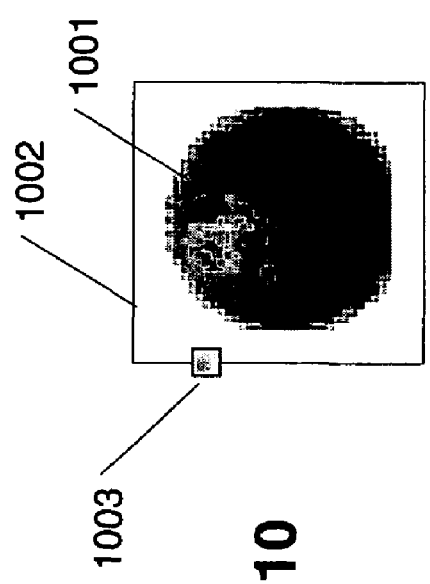
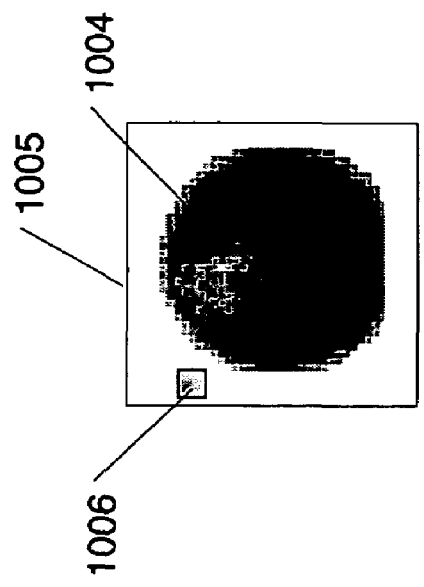
Figure 10
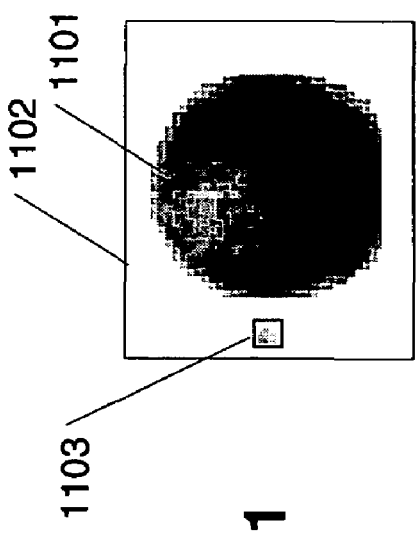
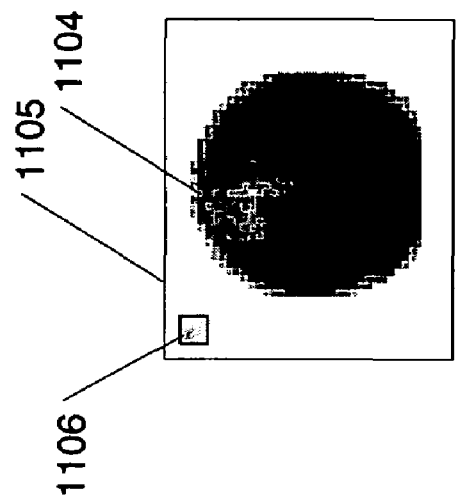
Figure 11

SELECTION INDICATION FIELDS

BACKGROUND OF THE INVENTION

1. Field of the Invention

Aspects of the present invention relate to computing systems. More particularly, aspects of the present invention relate to selecting objects using selection indication fields.

2. Description of Related Art

Computing systems accept a variety of inputs. Some inputs are used to select and/or launch multiple items. Two common methods of selecting multiple items include dragging a selection box around multiple items and selectively clicking each item while holding down a key on a keyboard or other key (for instance, a control key). A problem with dragging a selection box around multiple items is that the selection mechanism is cumbersome; it is difficult or impossible to select items without selecting other items located between the desired selections.

Single clicking on an item generally selects the item. However, attempting to select multiple items in a single click-to-launch environment is difficult. To do so, a user generally holds down a keyboard key while clicking on multiple items. A problem with using the combination of a pointing device and a physical keyboard is the issue that some users lack ready access to a keyboard. For instance, stylus-based computers lack ready access physical keyboards or lack keyboards entirely. Further, in some instances, the combination requires the use of two hands: one to operate a pointing device and the other to hold down the key.

Another issue with computers is the difficulty encountered when attempting to launch items. In some computing systems in which single clicking launches items, selecting various items is difficult without launching the items. In other computing systems, double clicking a pointing device launches items. A difficulty with double clicking is the requirement that the two clicks occur in roughly the same location. Users have a tendency to move the pointing device (including a mouse, trackball, and the like) slightly during clicking that frustrates their attempt to double click items. This issue also exists and is more challenging with stylus input devices. Additionally, the clicks need to be performed within a set period of time. Meeting this period can be more difficult with a stylus or other device.

An improved system and process for selection is needed for at least one of single- and double-click models.

BRIEF SUMMARY OF THE INVENTION

Aspects of the present invention address one or more of the problems described above, thereby providing an ability to select and/or act on multiple items using a pointing device. Acting may include dragging, copying, moving, deleting, and other actions.

BRIEF DESCRIPTION OF THE DRAWINGS

Aspects of the present invention are illustrated by way of example and not limited in the accompanying figures in which like reference numerals indicate similar elements.

FIG. 3 shows an illustrative example of selection indication fields in accordance with aspects of the present invention.

FIG. 4 shows another illustrative example of selection indication fields in accordance with aspects of the present invention.

FIGS. 5A-5D show additional illustrative examples of the selective display of selection indication fields in accordance with aspects of the present invention.

FIGS. 10 and 11 show illustrative examples of selection indication fields in relation to selectable items in accordance with aspects of the present invention.

DETAILED DESCRIPTION OF THE INVENTION

Figure 1:
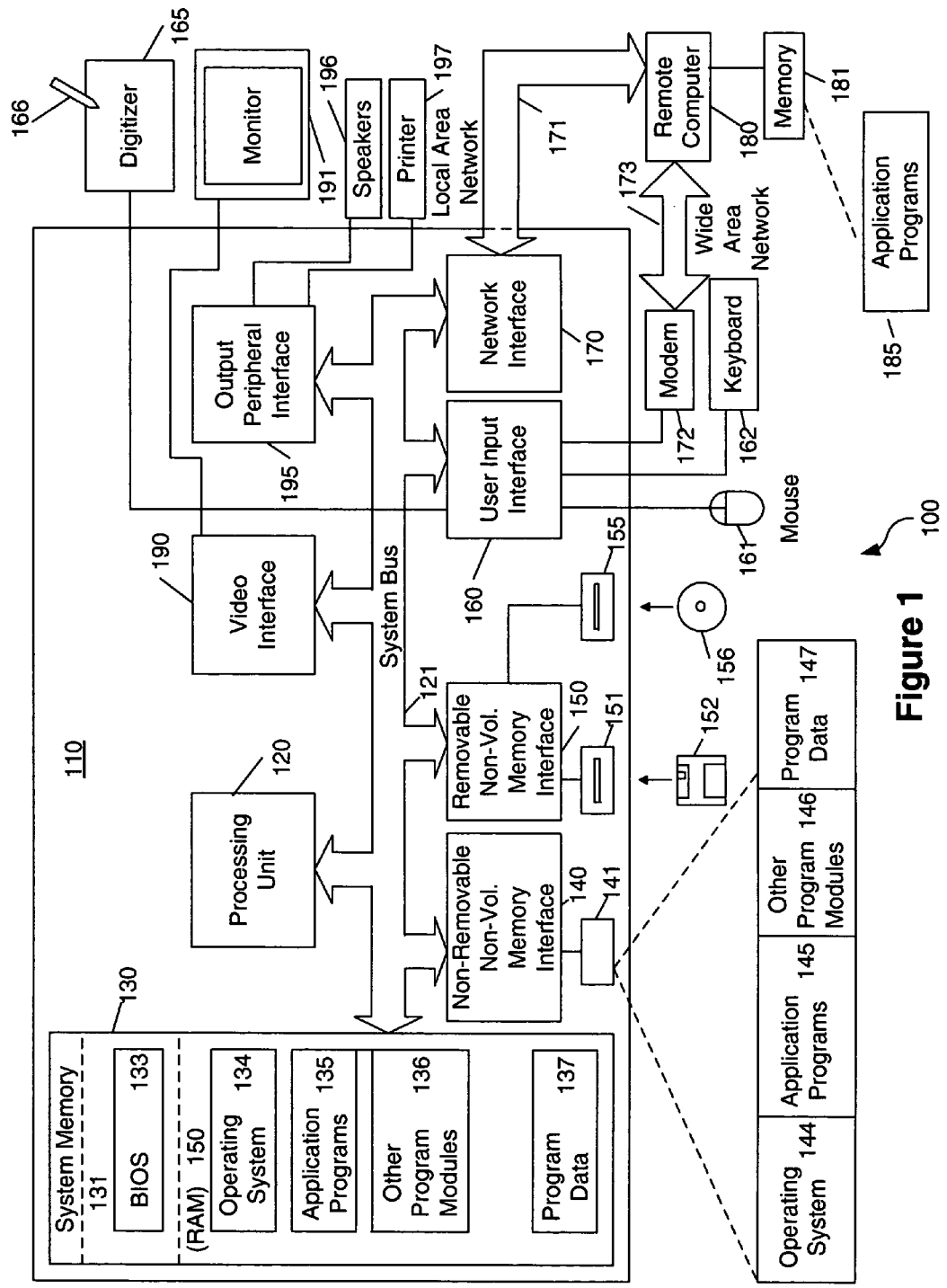
FIG. 1 shows an illustrative example of a general-purpose computing environment in accordance with aspects of the present invention.

Aspects of the present invention relate to providing a selection area for items. Through activation of the selection area, one may select and/or activate (or deselect and/or deactive, in other words, toggle a selection state) one or more items. The selection area may or may not be displayed when no pointing device or cursor of the pointing device is near. The items may include images, icons, notations and the like. In other words, an item may include anything that may be selected, launched, activated, deselected, deactivated, or have its selection state toggled.

This document is divided into sections to assist the reader. These sections include: selection and selection indication; characteristics of ink; terms; general-purpose computing environment; checkboxes; radio buttons, and other visual indications;

It is noted that various connections are set forth between elements in the following description. It is noted that these connections in general and, unless specified otherwise, may be direct or indirect and that this specification is not intended to be limiting in this respect.

Selection and Selection Indication

Aspects of the present invention relate to providing users with an improved method for selecting one or more items. A selection indication field may be located near, at, or on a selectable item. The user may then select that item and the selection is reflected in the selection indication field. In at least one aspect of the present invention, selection indication fields allow selection when a single click to open mode is used, making such a model a viable alternative to the double click model. A single click model in accordance with at least one aspect of the present invention, in turn, addresses the difficulty of launching by double clicking.

The selection indication field may include, but is not limited to, checkboxes, radio buttons, item selection states (including glow, box or other shape encompassing the item, a color field behind or on top of the item), and the like. Checkboxes and radio buttons are beneficial as they readily indicate to a user that an item has been selected. Surrounding rings or other shapes to show selection may be used as well. In some situations, checkboxes and radio buttons are easier for more audiences as they more readily indicate selection of items. One of the audiences is people who use the web, which uses a checkbox selection/single click-to-activate model.

Two embodiments for selection indication fields exist. First, the fields may persist irrespective of whether a pointing device or cursor from the pointing device is near the item to be selected. Second, the display of the fields is tied to whether a pointing device or cursor from the pointing device is near the item. In a first aspect of the second embodiment, the display of the selection indication fields may be associated solely with the position of the pointing device or cursor. In a second aspect of the second embodiment, the display of the selection indication fields may only vary for unselected items. In other words, once an item has been selected, the selection remains visible despite the cursor or pointing device having been moved away from the item. Further, the display of the selection indication field can also be dependent on the selection state. For instance, the display may include a separate display state for one or more of the following: selected items, unselected items without a pointer above the item, unselected with a pointer hovering over the item, items currently being pressed by the pointer, selected items without a pointer above the item, selected items with a pointer above the item, selected with a pointer present. Additional display options include displaying hover states when a pointer is over an item and separate hover states when the item is over the selection indication state.

One of the benefits for making unselected selection indication fields appear only when a pointing device or cursor is near them is to prevent the visual distraction of them when always present. In addition to minimizing visual distraction by disappearing the selection field when the pointing device is not near, making the selection appear when the pointing device comes into proximity potentially provides useful targeting feedback. Another benefit for at least one aspect of the invention may further include reinforcing the connection between an item and its associated selection field (in contrast to when, for instance, all selection indication fields are always displayed, which can make it difficult to discern which item is associated with which selection indication field). Selection indication fields in the form of checkboxes and radio buttons have a minimum size (height and width) in order to be easily targeted by a user. The minimum size of the check boxes and radio buttons is determined by a screen resolution and size requirements of the user. While larger checkboxes and radio buttons are easier to select, the larger sizes interfere with distract a user from displayed content. Further, selection indication fields may or may not extend beyond a boundary of an item.

Characteristics of Ink

Aspects of the present invention may be used with mouse-based computing systems and stylus-based computing systems. Stylus-based computing systems may optionally include computing systems that support electronic ink. Further, optional new/special selection fields may be created and/or used. For instance, a user may use ink a freeform check to indicate a selection rather than using a checkbox control. Here, the use of a freeform check made by a user may associate a selection action (here, a check mark) with an item (either below or near the check mark). Aspects of the invention may further the adoption of electronic ink as a computing standard. By allowing a user with a stylus to select multiple items across a page furthers the ability of stylus-based computers to penetrate an otherwise mouse and keyboard-driven computing environment. The following description relates to electronic ink and some of its features.

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve). Further examples include the way ink is absorbed into the fibers of paper or other surface it is deposited on. These subtle characteristics also aid in conveying the above listed properties. Because of these additional properties, emotion, personality, emphasis and so forth can be more instantaneously conveyed than with uniform line width between points.

Electronic ink (or ink) relates to the capture and display of electronic information captured when a user uses a stylus-based input device. Electronic ink refers to a sequence or any arbitrary collection of strokes, where each stroke is comprised of a sequence of points. The strokes may have been drawn or collected at the same time or may have been drawn or collected at independent times and locations and for independent reasons. The points may be represented using a variety of known techniques including Cartesian coordinates (X, Y), polar coordinates (r, Θ), and other techniques as known in the art. Electronic ink may include representations of properties of real ink including pressure, angle, speed, color, stylus size, and ink opacity. Electronic ink may further include other properties including the order of how ink was deposited on a page (a raster pattern of left to right then down for most western languages), a timestamp (indicating when the ink was deposited), indication of the author of the ink, and the originating device (at least one of an identification of a machine upon which the ink was drawn or an identification of the pen used to deposit the ink) among other information.

Among the characteristics described above, the temporal order of strokes and a stroke being a series of coordinates are primarily used. All these characteristics can be used as well.

Terms

| Term | Definition |
|---|---|
| Ink | A sequence or set of strokes with properties. A sequence of strokes may include strokes in an ordered form. The sequence may be ordered by the time captured or by where the strokes appear on a page or in collaborative situations by the author of the ink. Other orders are possible. A set of strokes may include sequences of strokes or unordered strokes or any combination thereof. Further, some properties may be unique to each stroke or point in the stroke (for example, pressure, speed, angle, and the like). These properties may be stored at the stroke or point level, and not at the ink level. |
| Ink object | A data structure storing ink with or without properties. |
| Stroke | A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or |

-continued

| Term | Definition |
| --- | --- |
| | what connects the points. |
| Document | Any electronic file that has a viewable representation and content. A document may include a web page, a word processing document, a note page or pad, a spreadsheet, a visual presentation, a database record, image files, and combinations thereof. |

General-Purpose Computing Environment

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, touch-based computing systems, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In some aspects, a pen digitizer 165 and accompanying pen or stylus 166 are provided in order to digitally capture freehand input. Although a direct connection between the pen digitizer 165 and the user input interface 160 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including accelerometers, magnetometers, and gyroscopes.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
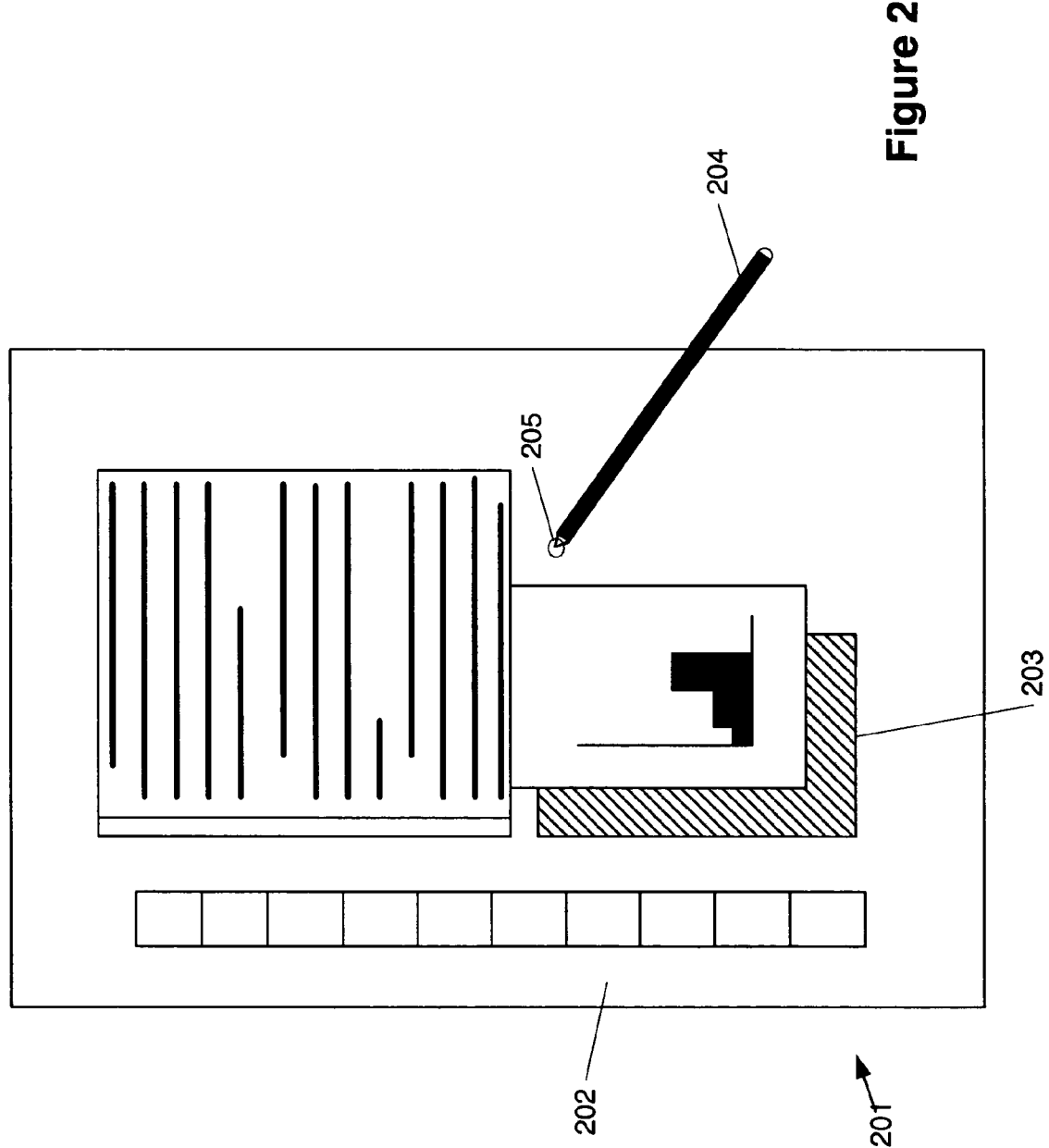
FIG. 2 shows an illustrative example of a tablet computer in accordance with aspects of the present invention.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers and capacitive digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger(s) could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the .Net programming model from Microsoft Corporation.

Checkboxes, Radio Buttons, and Other Visual Indications

Various selection indication fields may be used in conjunction with embodiments of the present invention. The selection indication fields may include check boxes, radio buttons, and other visual indications that provide a user with the ability to select multiple items using one or more pointing devices. The following describes the use of selection indication fields as well as modifications to the selection indication fields to help the user target the selection indication fields more successfully.

In addition to selecting items, users may be presented with the ability to act on selected items using the selection indication fields. This additional ability helps build a complete experience for users. This ability leverages users' experiences with check boxes and radio buttons from use of the Internet.

FIG. 3 shows an illustrative example where selection indication fields are shown alongside selectable items. FIG. 3 shows a window 301 having a collection of items 302-307 with selection indication fields 308-313. Selection indication fields 308, 310, and 313 are shown as having been selected. Selection indication fields 309, 311, and 312 are shown as unselected. In this example, the selection indication fields are displayed irrespective of the location of a pointing device or cursor. An item may include one or more parts. For instance, an icon and text label together may form an item. In various views (e.g., a "details" view), an item may include an entire line and include multiple parts (for example, icon, name, date, size, and other properties).

FIG. 4 shows an embodiment in which selection indication fields are only shown when a pointing device or cursor overlies an item or if the item is currently selected. FIG. 4 includes documents A-F 401-406 and stylus 407 is shown as a pointing device whose tip overlies item 401 (here, document A). Alternatively, a cursor may overlie item 401. When the pointing device 407 or cursor from the pointing device overlies an item, the item's selection indication field may be shown in concert with the appearance of hover feedback (for instance, the display of selection indication field 408) so that the user may select or launch the item. Once the pointing device 407 or cursor moves away from the item, the selection indication field disappears. Selection indication fields associated with items 402-403 and 405-406 are not shown because the items have not been selected and the pointing device 407 or cursor is not over them. Document D 404 has been selected. Its selection indication field 409 remains displayed with an indication of the document D 404 being selected presently. The item may or may not further include a selected state/appearance in addition to the selection indication field. This may be a colored rectangle enclosing the item or other visualization described above. In the case of a checkbox, the checkbox may contain a checkmark. Likewise, in the case of a radio button, the radio button may be filled.

FIGS. 5A-5D show a sequence in which a stylus 501 selects document A then moves away. In FIG. 5A, stylus 501 is not near document A 502 or document B 503. In FIG. 5B, stylus 501 overlies document A 502 and selection indication field 504, associated with document A 502, is displayed. In FIG. 5C, the stylus has selected selection indication field 504 or has selected document A 502. Here, the selection indication field 505 is shown in a selected state. In FIG. 5D, the stylus 501 has moved away from document A 502, leaving it in a selected state with selection indication field 505 in a selected state.

One of the benefits of making unselected selection indication fields disappear when the cursor or pointing device is not near them or their related item is that it reduces visual clutter. In some situations, with closely positioned or overlapping items, it may be difficult to determine which item is about to be selected unless the selection indication fields are hidden. By hiding unselected selection indication fields and visual indication fields not overlaid by the cursor/stylus, visual clutter and confusion may be reduced while maintaining the ease of use of a selection indication field interface for selecting and/or launching items.

FIGS. 5B and 5C show two different states of the selection indication field. Here, FIG. 5B shows an illustrative hover state over an item. FIG. 5C shows hover over a selection field while FIG. 5D shows the selection indication field having been selected. Alternatively, the same visual indication may be used for hover and selection. One of the benefits for using two different states is to provide a line of distinction between selection and merely providing a location to select. Further, the display of the selection indication field can also be dependent on the selection state. For instance, the display may include a separate display state for one or more of the following: selected items, unselected items without a pointer above the item, unselected with a pointer hovering over the item, items currently being pressed by the pointer, selected items without a pointer above the item, selected items with a pointer above the item, selected with a pointer present. Additional display options include displaying hover states when a pointer is over an item and separate hover states when the item is over the selection indication state.

Further, on hover over the item and hover over the selection indication field may provide the same displayed state for the selection indication field. Alternatively, the two hover targets may result in two different visual states for the selection indication fields. This may help users appreciate that selecting the selection indication field is distinct from selecting the item. Selecting the item allows an action to occur on the selected item at that time. Selecting the selection indication field may specify that a future action can occur with on the selected item or items similarly designated.

Figure 6A:
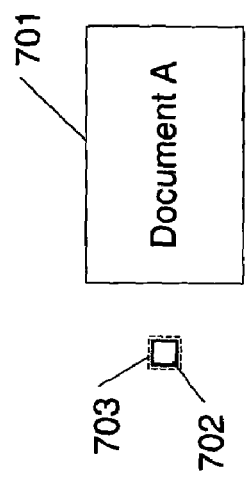
FIGS. 6A and 6B show size of modification of selection indication fields in accordance with aspects of the present invention.
Figure 6B:
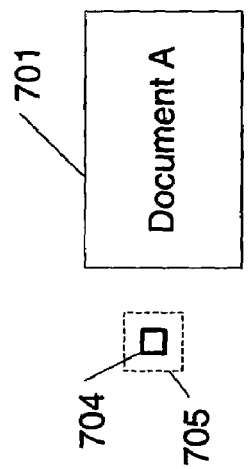

Targeting a selection indication field may be difficult for some users. Accordingly, in some aspects of the invention, the size of the selection indication field may be increased. FIG. 6A shows document A 601 with selection indication field 602 of a given size. FIG. 6B shows document A 601 with a larger selection indication field 603.

Figure 7A:
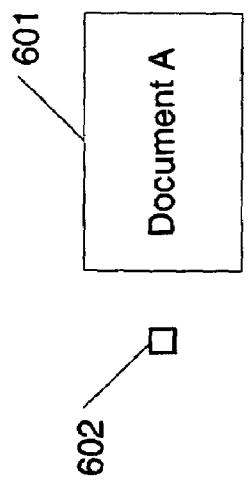
FIGS. 7A and 7B show size modification of selection areas of selection indication fields in accordance with aspects of the present invention.
Figure 7B:
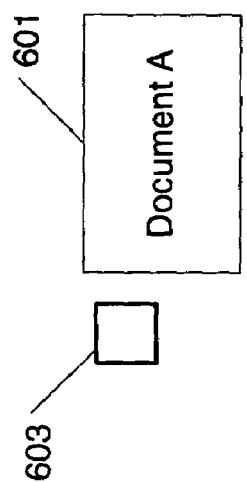

FIGS. 7A and 7B show an example where a selection indication field remains the same size while the target area to select the selection indication field has been increased. In FIG. 7A, document A 701 has associated selection indication field 702 and target area 703. In FIG. 7B, document A 701 has associated selection indication field 704 with larger target area 705. The large target area provides the benefit of easier selection when using, for example, a stylus as a pointing device. One advantage that increasing the target area compared to increasing the size of the selection field is that the displayed selection fields are easier to use while not detracting from the visual clarity of smaller selection indication fields.

Figure 8:
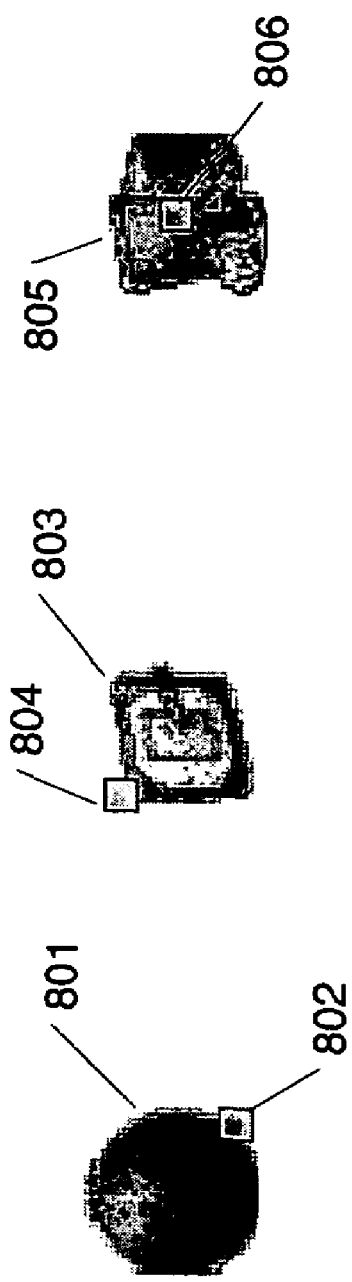
FIG. 8 shows illustrative examples of selection indication fields overlapping items in accordance with aspects of the present invention.

FIG. 8 shows examples of selection indication fields overlapping items. In one aspect, the items are overlapped by selection indication fields. Each of selection indication fields 802, 804, and 806 overlie items 801 (lower outside edge), 803 (upper outside edge), and 805 (center). However, in this example, the selection indication fields obscure the underlying items.

Figure 9:
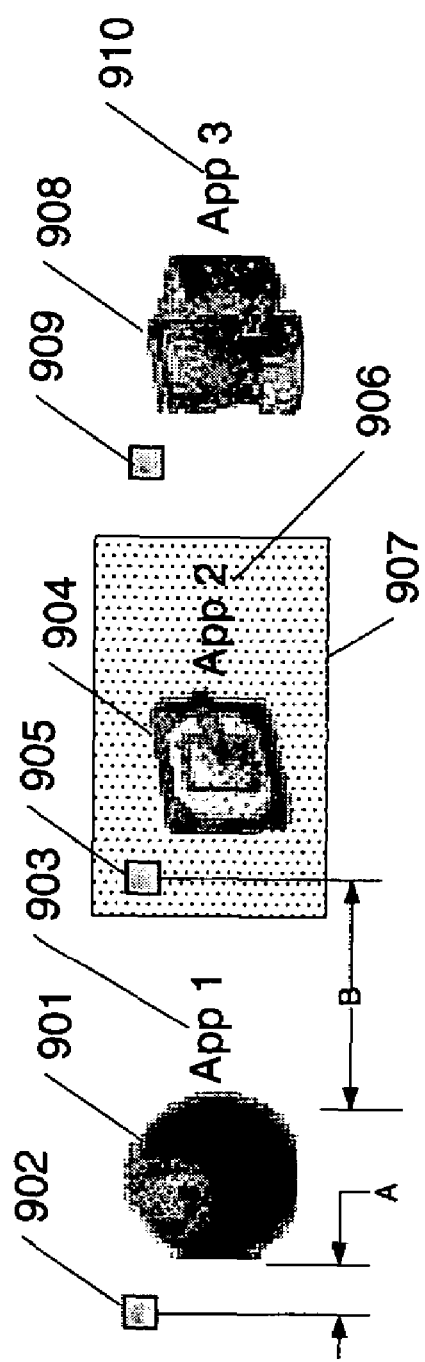
FIG. 9 shows illustrative examples of selection indication fields proximate selectable items in accordance with aspects of the present invention.

FIG. 9 shows an alternative approach in which a gutter distance A (the distance between a selection indication field (for instance 902) and associated item (901) is less than the distance between item 901 and another selection indication field 905. Here, selection indication field 905 is associated with item 904 and selection indication field 909 is associated with item 908. Each of items 901, 904, and 908 may optionally have labels 903, 906, and 910 associated with each.

Where gutter widths may increase, the system may optionally include a selection rectangle (for instance, that may only be shown on hover or when the selection indication field is selected). Here, region 907 represents an area surrounding items 904 and selection indication field 905 that hovering over may enable the display of the selection indication field 905. This may reinforce the connection between an item and a selection indication field.

The selection indication field may be placed in a number of locations. FIG. 10 shows examples of a selection indication field 1003 on an edge of a selection region 1002 surrounding item 1001. Also, FIG. 10 shows selection indication field 1006 inside selection region 1005 surrounding item 1004.

Also, as shown in FIG. 11, the selection indication field may be moved inside a selection region. Further, tapping on an unselected selection region may result in a different outcome then tapping on the item itself. Tapping on an item may dismiss previous selections. Clicking within the target area for the selection indication field may result in one outcome whereas tapping outside of that area (even within the "selection region") may result in a different outcome. Here, selection region 1103 is near the midline of item 1101 in region 1102. Also, selection indication field 1106 is moved to a corner of selection region 1105 surrounding item 1104. The system may support moving the selection indication field to one location for all selection regions for consistency. This approach may help with very large items (e.g., large thumbnails of images). By placing the selection indication field, for example, to the upper-left of the item (e.g., icon/thumbnail) regardless of the item's size, one may keep the design consistent with the user expectation of the checkbox appearing on the left. In addition, aligning it to the top may provide a more pleasant layout and consistent targeting expectations when moving between views with icons/thumbnails of disparate sizes.

Figure 12:
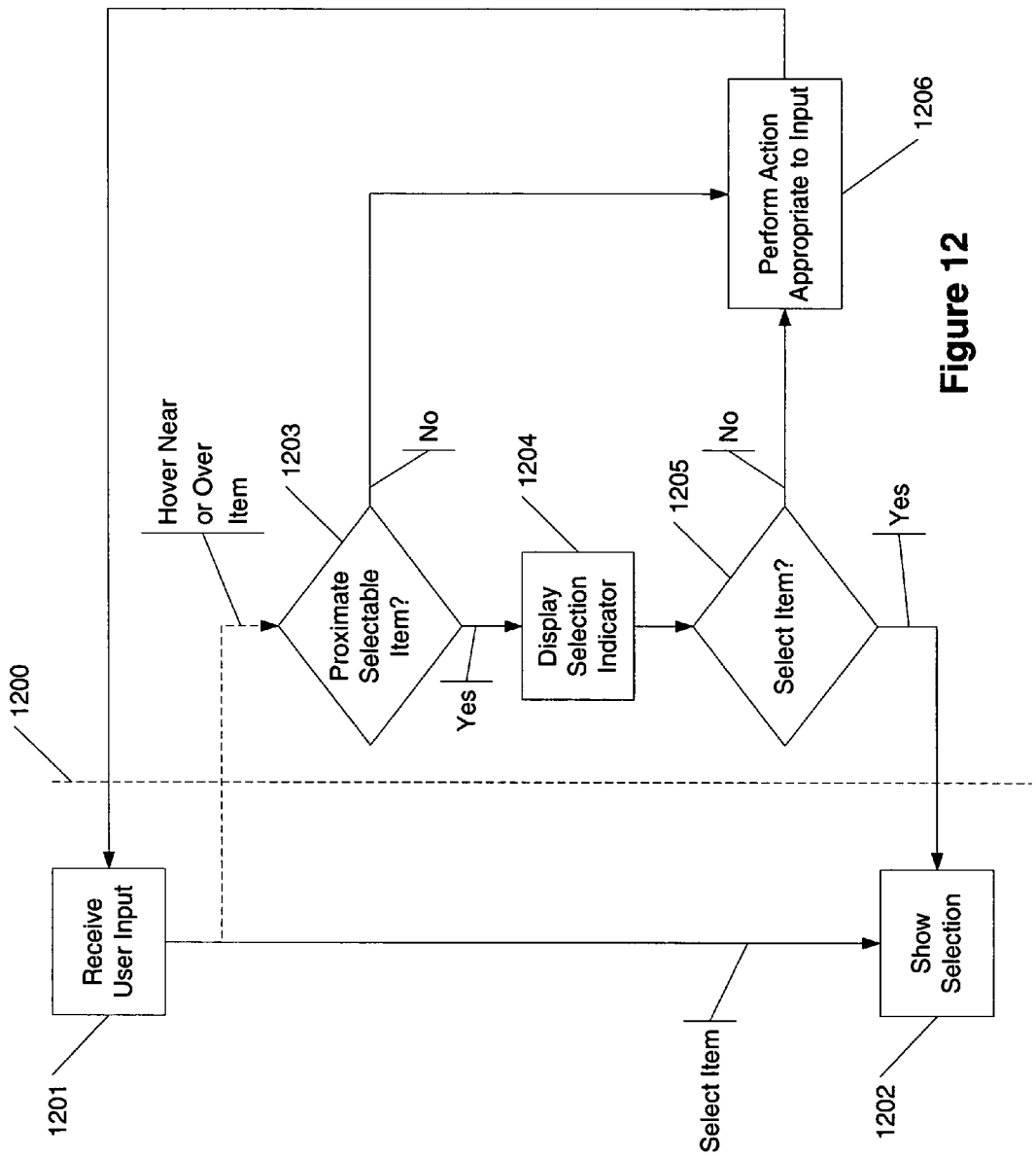
FIG. 12 shows various processes for selecting selection indication fields in accordance with aspects of the present invention.

FIG. 12 shows various approaches to selecting items or selection indication regions. In a first example, in step 1201, a user input is received. The user input is the selection of an item. In step 1202, the system shows the selection indication field as selected.

In an alternative approach (shown by dividing line 1200), the display of a selection indication field may be predicated on hovering of a pointing device or cursor over an item or selection indication region. If hovering over or near an item, the process may determine in step 1203 whether the hovering is on or near a selectable item. If no, then the system performs an action according to the input in step 1206 then returns to waiting for user input in step 1201.

If yes, from step 1203, then the system displays the selection indication field in step 1204. In step 1205, the system determines whether the item has been selected. If no, then step 1206 is executed. If yes, then step 1202 is performed, which shows the selection of the item in the selection indication field.

Depending on implementation, the selection of an item may permit the user to perform additional actions including moving, deleting, copying, duplicating, and other operations. Further the user may open or execute the selected items.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A method for displaying selection indication fields comprising the steps of:
    displaying a graphical interface on a display, the graphical interface comprising one or more selectable items;
    receiving user input via a pointing device;
    determining that the user input corresponds to a region of the graphical interface proximate to a first selectable item;
    displaying on the display in the region of the graphical interface a selection indication field corresponding to the first selectable item, wherein selecting the first selectable item performs a different function than selecting the selection indication field corresponding to the first selectable item, such that a separate display state is displayed when the pointing device is hovering over the first selectable item and a different separate display state is displayed when the pointing device is hovering over the selection indication field;
    receiving additional user input via the pointing device;
    determining that the additional user input corresponds to a region outside of the region of the graphical interface;
    determining whether the first selectable item is currently selected; and
    continuing to display the selection indication field in the region of the graphical interface only if the first selectable item is currently selected.

2. The method according to claim 1, further comprising the steps of:
    determining whether said first selectable item is currently selected; and
    displaying said selection in said selection indication field corresponding to the first selectable item.

3. The method of claim 1, wherein the selection indication field comprises one of a check box and a radio button.

4. The method of claim 2, wherein the selection indication field comprises a freeform electronic ink drawing region, and wherein displaying the selection indication field comprises displaying a previously stored electronic ink marking made within the freeform electronic ink drawing region.

5. A system for displaying selection indication fields comprising:
    a memory coupled to a processing unit;
    a graphical interface on a display, the graphical interface comprising one or more selectable items;
    means for receiving user input corresponding to a location on the graphical interface;
    means for determining that the user input corresponds to a region of the graphical interface proximate to a first selectable item; and
    means for displaying on the display in the region of the graphical interface a selection indication field corresponding to the first selectable item;
    means for selecting the first selectable item and displaying a separate display state; and
    means for selecting the selection indication field corresponding to the first selectable item and displaying a different separate display state, wherein a separate display state is displayed when the pointing device is hovering over the first selectable item and a different separate display state is displayed when the pointing device is hovering over the selection indication field;
    means for receiving additional user input corresponding to a location on the graphical interface;
    means for determining that the additional user input corresponds to a region outside of the region of the graphical interface;
    means for determining whether the first selectable item is currently selected, wherein the means for displaying the selection indication field continues to display the selection indication field in the region of the graphical interface only if the first selectable item is currently selected.

6. The system according to claim 5, further comprising:
    means for determining whether said first selectable item is selected; and
    means for displaying said selection in said selection indication field corresponding to the first selectable item.

7. The system according to claim 5, wherein the selection indication field comprises one of a check box and a radio button.

8. The system according to claim 6, wherein the selection indication field comprises a freeform electronic ink drawing region, and wherein the means for displaying the selection indication field comprises means for displaying a previously stored electronic ink marking made within the freeform electronic ink drawing region.

9. A method of displaying a computer-readable medium for a displaying selection indication fields comprising the steps of:

displaying a graphical interface on a display, the graphical interface comprising one or more selectable items;

receiving user input via a pointing device;

determining that the user input corresponds to a region of the graphical interface proximate to a first selectable item; and displaying on the display in the region of the graphical interface a selection indication field corresponding to the first selectable item;

selecting the first selectable item and displaying a separate display state; and selecting the selection indication field corresponding to the first selectable item and displaying a different separate display state, wherein a separate display state is displayed when the pointing device is hovering over the first selectable item and a different separate display state is displayed when the pointing device is hovering over the selection indication field;

receiving additional user input via the pointing device;

determining that the additional user input corresponds to a region outside of the first region of the graphical interface;

determining whether the first selectable item is currently selected; and continuing to display the selection indication field in the second region of the graphical interface only if the first selectable item is currently selected.

10. The method of claim 9, further comprising the steps of:

determining whether said first selectable item is selected; and displaying said selection in said selection indication field corresponding to the first selectable item.

11. The method of claim 9, wherein the selection indication field comprises one of a check box and a radio button.

12. The method of claim 10, wherein the selection indication field comprises a freeform electronic ink drawing region, and wherein displaying the selection indication field comprises displaying a previously stored electronic ink marking made within the freeform electronic ink drawing region.

* * * * *

UNITED STATES PATENT AND TRADEMARK OFFICE
CERTIFICATE OF CORRECTION

PATENT NO. : 7,458,038 B2  Page 1 of 1
APPLICATION NO. : 11/015347
DATED : November 25, 2008
INVENTOR(S) : Emily Rimas-Ribikauskas et al.

It is certified that error appears in the above-identified patent and that said Letters Patent is hereby corrected as shown below:

In column 13, line 5, in Claim 9, before "displaying" delete "a".

Signed and Sealed this
Tenth Day of May, 2011

David J. Kappos
*Director of the United States Patent and Trademark Office*